Aug. 24, 1937.  P. C. BESHERS  2,091,024
APPARATUS FOR DENOTING GRADES OF OIL FOR GAS ENGINE CYLINDERS
Filed Aug. 20, 1936
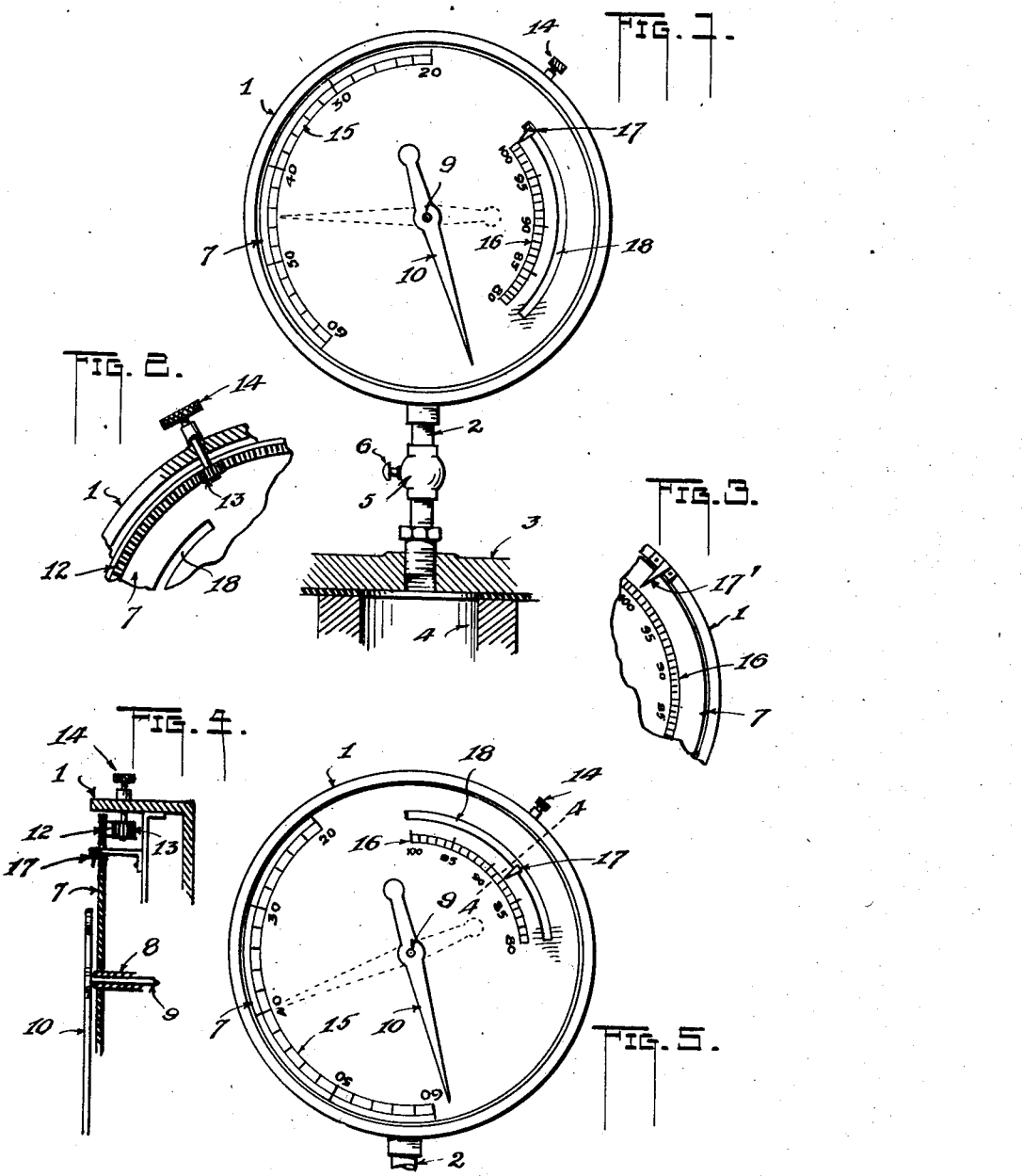

Patented Aug. 24, 1937

2,091,024

UNITED STATES PATENT OFFICE 2,091,024

APPARATUS FOR DENOTING GRADES OF OIL FOR GAS ENGINE CYLINDERS

Paul C. Beshers, El Paso, Ill.

Application August 20, 1936, Serial No. 96,953

3 Claims. (Cl. 73—31)

This invention relates to an apparatus for use in determining proper grades of oil to be used in gas engine crank-cases under varying conditions of piston cylinder wear.

An object of the invention, while providing for various grades of oil viscosity, is that of the determination of the degree of piston seal in the worn cylinder of a given engine or motor through the use of a suitable type of gauge, for example, and then by means of a manually adjusted indicator readable at the assumed position of such gauge for that engine determine the predetermined proper grade of viscosity of oil, indicated by grade-number, or otherwise, suitable for said engine.

The appended drawing illustrates an apparatus for use in accomplishing the purpose of the invention, it being understood, however, that it is not my intention to be confined to the exact mechanism shown since changes may be made therein, perhaps, to serve the desired purpose.

In said drawing:

Figure 1 is a front elevation of an apparatus suitable for my purpose.

Figure 2 is a rear elevation, in detail, of parts of the same.

Figure 3 is a modification of a dial and indicator shown in Figure 1.

Figure 4 is a transverse section of parts of the apparatus produced on line 4—4 of Figure 5, and Figure 5 is similar to parts of Figure 1 showing a dial adjusted to a different position from that shown in the figures named.

It is well known, of course, that oil dealers have heretofore provided several grades of oil, one or another of which has been determined to be fairly suitable for use in a given make of engine or motor when new.

Engines or motors of different manufacture when new differ somewhat in the amount of compression and certain grades of oil may be found to answer fairly well in one or another of them. However, after long use engines gradually lose compression due to wear of piston and cylinder walls so that a thin oil which was about correct, perhaps, for an engine of a given make, when new, now fails to answer for proper lubrication and in maintaining compression. Naturally an oil of increasing viscosity must be used as wear increases.

Two engines of the same make, and that are identical in condition when new, may differ widely in the amount of wear even when both have had the same extent of use in car-mileage covered. And since mileage recorded in any two cannot be depended upon to show engine condition, naturally the common method of providing a supposed proper grade of oil cannot be relied upon.

Through testing various automobile engines of given makes under varying conditions of wear it is possible to readily find a grade of oil best suited to any one of them under a given condition. Automobile manufacturers or oil companies, or both jointly, may by tests, therefore, provide a large number of grades or viscosities of oil so that service stations by suitable guiding-data may at any time serve an engine or motor with the grade of oil suitable to it upon determining the condition of its cylinders as shown by a suitable gauge, for example, and assisting indicator means.

My invention includes in this instance a gauge, the body of which is denoted in the figures of the drawing by the character 1. This by means of a suitable fitting 2 may be placed in position at the head of the engine 3 and used to test a cylinder denoted at 4. Said fitting 2 may preferably be provided with a check valve 5, which may be of such nature that a manually operated button 6, for example, may act upon the valve thereof when desired to permit the pointer of said gauge to return to "off" position after each operation.

A dial 7 is mounted so as to rotate, being carried in this instance on a tube 8, extending from a part of the gauge, not shown. Extending through the tube is an arbor 9 carrying an indicator or pointer 10 which may normally lie in the position shown in full lines in Figures 1 and 5.

Said dial 7 is designated to be manually rotated and for that purpose it may for instance, include a toothed rack 12, while a pinion 13 may engage the rack for rotating said dial through a suitable knob 14. However, other means of imparting rotation to the dial may be adopted, or it may be rotated by direct action of the operator's fingers thereon.

Though not shown, any manner of maintaining the dial frictionally or otherwise in any position of adjustment may be resorted to.

Upon said dial a scale 15 is represented including a series of numerals, for example, which in this instance read from 20 to 60 indicating oil viscosities, these figures being arbitrarily chosen, while at another position the dial carries a second scale 16 having indicating values from 80 to 100, as an example, to show compression values in cylinders when new. In fixed position on the gauge body 1 is a pointer 17 adjacent which the scale 16 is adapted to travel in any rotative movement imparted to said dial 7.

Two different ways are shown as examples of the pointer and dial arrangement. That is to say, in Figures 1 and 5 an arcuate slot 18 is provided in the dial, the pointer 17 extending therethrough from any desired fixed part of the gauge body, whereas in the modified form, Figure 3 the pointer 17' extends from a part of the casing body 1, the slot 18 of Figure 1 not being necessary in this instance.

The indicator or pointer 10 in the present form of arrangement is designed to be influenced by pressure within the engine cylinder, or by various degrees of vacuum created in the latter as will be mentioned later herein, any usual and well known mechanism being employed in the gauge for actuating said pointer, the check valve 5 preventing movement of the actuating fluid to prevent retrograde movement of the said pointer 10 at such times. The numbers at the scale 16 may represent, severally, the maximum compression in a cylinder of an engine or motor of a given manufacture, when new, such compression resulting at cranking speed with full open throttle, for example.

To determine the grade of oil best suited to a given engine or motor whose pistons and cylinders have been worn after long use, the dial 7 is so adjusted as to place such a number of the scale 16 opposite the pointer 17 as will represent the known maximum compression of that engine or motor when new. Due to the rotation of the dial to the position named the scale 15 is shifted with respect to the pointer 10 at its attained compression position in the tested cylinder, said pointer therefore reading directly upon the grade of oil to be serviced to that engine. Otherwise stated, the pointer at the time of test has, of course, fallen short of reaching the position of highest compression obtaining when the engine was new, and therefore indicates by its position the lowered degree of compression.

The two scales 15 and 16 are so placed relatively to each other that whereas a very light oil suffices in an engine when new, the scale 15 and pointer 10 at the reduced compression, now indicate a given predetermined heavier grade of oil for the worn engine at such reduced compression.

If it be supposed that all of the cylinders of a given engine are in like worn condition the oil of grade found proper for one may, of course, be correct for all of them. Naturally, if the pointer 10 is not effected by the driving movement of the piston of the tested cylinder radical attention is required.

By using different sets of constants for scale 16 it will be possible to determine the different grades of oil at scale 15 for summer or winter use. In other words if a given make of engine is to be serviced and the constants of the said scale 16 are for summer use for that engine, when new, the grade of oil will be shown at scale 15 for summer use. Again, if the constants at said scale 16 are arranged for winter use the scale 15 may be so set as to show by pointer 10 a proper light grade of oil for that particular engine for such winter use, giving in either case 100% performance of the engine.

Again, the constants at the scale 16 may be varied depending upon how the tests are to be made. That is to say at cranking speed with wide open throttle or even at full speed, certain constants are usable. Also, where tests are made at explosion pressures other constants may be used. Again, a gauge may be employed perhaps, for testing by the vacuum method, i. e., through fluid movement as set up by suction of the piston. In that event the constants may again vary, the reading order of such constants being the reverse of that shown in the drawing.

It is not my intention to be confined to any given type of mechanism for accomplishing the purpose herein, nor to the method of procedure there since other ways may be resorted to, perhaps, for practicing the steps, my invention contemplating any such ways as may be found practicable.

I claim:

1. A gauge for use in connection with engine cylinders to indicate the proper viscosity of oil to be used depending on the effectiveness of the piston and cylinder in compressing, which gauge comprises a rotatable dial graduated in terms of oil viscosities, an indicator operative thereover under the influence of engine compression, and adapted to point to the graduation for proper viscosity of oil to be used, means for moving the dial with respect to the indicator, and a scale for determining the degree of movement of the dial, said scale being graduated to indicate pressure values representative of the compression efficiency of an engine at different successive intervals of its wear, said scale being in such spaced relation to the oil viscosity graduations of the dial that upon a setting of the dial in accordance with engine compression values, the indicator will register an oil viscosity value suitable for the particular engine compression value to which the dial has been set.

2. A guage for use in connection with engine cylinders to indicate the proper viscosity of oil to be used depending on the effectiveness of the piston and cylinder in compressing, which gauge comprises a rotatable dial graduated in terms of oil viscosities progressively clockwise from more viscous to less viscous, an indicator operative thereover and adapted to react under the influence of engine compression clockwise and adapted to point to the graduation for proper viscosity of oil to be used, means for moving the dial with respect to the indicator, and a scale for determining the degree of movement of the dial, said scale being graduated to indicate pressure values representative of the compression efficiency of an engine at different successive intervals of its wear and clockwise progressively lower, said scale being in such spaced relation to the oil viscosity graduations of the dial that upon a setting of the dial in accordance with engine compression values, the indicator will register an oil viscosity value suitable for the particular engine compression value to which the dial has been set.

3. A gauge for use in connection with engine cylinders to indicate the proper viscosity of oil to be used depending on the effectiveness of the piston and cylinder in compressing, which gauge comprises a rotatable dial graduated in terms of oil viscosities progressively in a given direction from more viscous to less viscous, an indicator adapted to point to the graduation for proper viscosity of oil to be used and operative over said dial under the influence of engine compression from graduations indicative of high viscosity in the direction of those indicative of low viscosity, means for moving the dial with respect to the indicator, and a scale for determining the degree of movement of the dial, said scale being graduated to indicate pressure values representative of the compression efficiency of an engine at different successive intervals of its wear, and progressively lower in the same direction as the graduations for oil viscosities, said scale being in such spaced relation to the oil viscosity graduations of the dial that upon a setting of the dial in accordance with engine compression values, the indicator will register an oil viscosity value suitable for the particular engine compression value to which the dial has been set.

PAUL C. BESHERS.